United States Patent [19]
Will

[11] 3,874,928
[45] Apr. 1, 1975

[54] HERMETICALLY SEALED SECONDARY BATTERY WITH LANTHANUM NICKEL ANODE

[75] Inventor: Fritz G. Will, Scotia, N.Y.

[73] Assignee: General Electric Company, Schenectady, N.Y.

[22] Filed: June 29, 1973

[21] Appl. No.: 374,907

[52] U.S. Cl. ............ 136/6 R, 136/20, 136/28
[51] Int. Cl. .......................... H01m 35/02
[58] Field of Search ............... 136/28–29, 136/20, 120, 120 FC, 6 R, 137, 83 R, 86 D, 86 DD, 100 R

[56] References Cited
UNITED STATES PATENTS

| | | | |
|---|---|---|---|
| 3,311,502 | 3/1967 | Dryden | 136/28 |
| 3,405,008 | 10/1968 | Dilworth et al. | 136/120 FC X |
| 3,692,584 | 9/1972 | King | 136/83 R |

*Primary Examiner*—Anthony Skapars
*Attorney, Agent, or Firm*—Paul R. Webb, II; Joseph T. Cohen; Jerome C. Squillaro

[57] ABSTRACT

A hermetically sealed secondary battery has at least one solid cathode, at least one hydrogen gas diffusion anode of lanthanum nickel spaced from the cathode, and an alkaline electrolyte in contact with the cathode and anode. Such a battery provides a light-weight, high-power output device.

4 Claims, 1 Drawing Figure

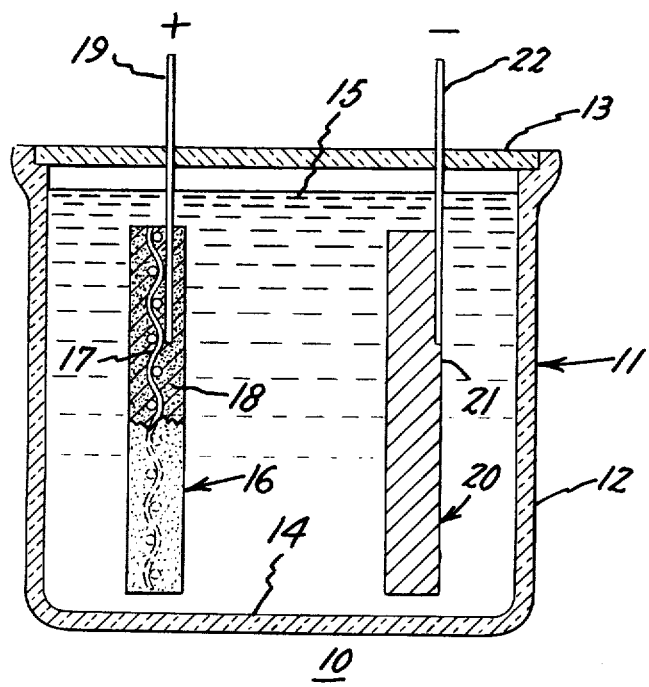

HERMETICALLY SEALED SECONDARY BATTERY WITH LANTHANUM NICKEL ANODE

This invention relates to secondary batteries and, more particularly, to secondary batteries in which a solid cathode and a hydrogen gas diffusion anode of lanthanum nickel are in contact with an alkaline electrolyte.

Hermetically sealed secondary batteries, which employ hydrogen gas diffusion electrodes, are desirable as power sources.

In U.S. Letters Pat. No. 3,476,607, there is described a deferred action self-timing fuel cell wherein a given amount of hydrogen gas is permitted to diffuse into and become absorbed in the hydrogen electrode, preferably palladium. Since the hydrogen electrode is sealed from the external environment, no gas exists above or adjacent to the hydrogen electrode. This quantity of gas accordingly is rate controlling and the device is so designed that it will fail as soon as the hydrogen gas supply absorbed in the hydrogen electrode is depleted. Such a time span can be of the order of say 2 to 6 seconds. The zone or chamber adjacent to the other or reducing electrode, e.g., the oxygen chamber, can be sealed or open, and a captive or sealed source of oxidizer, which can be in solid or fluid form, preferably a sealed source of oxygen, e.g., contained in a fracturable container or vial, may be provided to such reducing electrode by breaking or fracturing the vial with the oxidizer, e.g., oxygen, flowing or diffusing to the electrode surface.

British Pat. No. 5261/1881 describes a secondary battery with lead plates and an exciting liquid which is assumed to be sulfuric acid. Upon charging the positive electrode disengages hydrogen which is carried to the negative electrode. The negative electrode disengages oxygen which stores itself as the positive electrode. When the battery is charged the negative plate is situated above its corresponding positive plate. During discharge the battery is inverted.

My present invention is directed to a unique secondary battery employing a solid cathode and a gas diffusion anode of lanthanum nickel which battery has a theoretical energy density comparable to commercial nickel-cadmium batteries.

It is a primary object of my invention to provide a light-weight, high-power output battery.

In accordance with my invention, a hermetically sealed secondary battery has a casing, at least one solid cathode positioned within the casing, at least one hydrogen gas diffusion anode of lanthanum nickel positioned within the casing and spaced from the cathode, and an aqueous alkaline electrolyte in contact with both the cathode and the anode.

These and various other objects, features and advantages of the invention will be better understood from the following description taken in connection with the accompanying drawing in which:

The single FIGURE is a sectional view of a hermetically sealed secondary battery embodying my invention.

In the single FIGURE of the drawing there is shown generally at 10 a battery embodying my invention, which battery or cell has a casing 11 with a body portion 12 having a closed bottom and an open top, and a cover portion 13 fitting tightly over the open top of body portion 12 thereby providing a hermetically sealed casing. Casing 11 defines a chamber 14 in which there is provided an electrolyte 15 of an aqueous alkaline solution such as potassium hydroxide. A metallic oxide positive electrode 16 is positioned within casing 11 and immersed at least partially in electrolyte solution 15. Electrode 16 is shown as a nickel hydroxide electrode which has an electrically conductive screen 17 with nickel hydroxide powder 18 sintered thereon. An electrical conductive lead 19 is in electrical contact with screen 17 and extends outwardly through an opening in cover portion 13.

A negative electrode 20 is positioned within casing 11, is immersed at least partially in electrolyte solution 15 and is spaced from positive electrode 16. Negative electrode 20 is shown in the form of a solid plate 21 of lanthanum nickel with an electrically conductive lead 22 which lead extends outwardly through an opening in cover portion 13.

I found unexpectedly that I could form a hermetically sealed secondary battery employing lanthanum nickel as the hydrogen gas diffusion electrode which battery provides a theoretical energy density comparable to a standard nickel cadmium battery. The present battery employing a nickel hydroxide cathode and a lanthanum nickel anode has a theoretical density of 100 Wh/lb which compares well with 97 Wh/lb of a standard nickel cadmium battery. My unique battery produces an open circuit voltage of 1.3 volts and produces current density up to 50 ma/cm$^2$.

I found unexpectedly that lanthanum nickel in various configurations provides a very suitable hydrogen gas diffusion electrode which can be employed in a hermetically sealed battery. I knew previously of work of others which had shown that some hexagonal intermetallic compounds of the composition AB$_5$ where A represents a rare earth metal and B represents nickel cobalt can readily absorb and desorb large quantities of hydrogen gas under relatively small pressures at room temperature. Other than the above information relative to such hexagonal intermetallic compounds nothing appeared to be known to others or myself about the catalytic properties of this class of compounds. Furthermore, there was no previous information of which I was aware that an electrode could be made of such material and secondly that such an electrode could be employed as a hydrogen gas diffusion electrode in an electrolyte solution.

I found that lanthanum nickel exhibited considerable catalytic activity with respect to hydrogen. I found further that it was suitable for use as an electrode in electrochemical devices such as batteries and fuel cells. I discovered further that lanthanum nickel as the anode could be employed in a battery and coupled with a variety of common commerical cathodes to result in useful batteries. I found in particular that cathodes of nickel hydroxide, silver oxide, or manganese dioxide could be coupled with the lanthanum nickel for suitable use in batteries. I found further that the potential of a charged lanthanum nickel electrode is close to that of a reversible hydrogen electrode. Thus, I was able to form a battery with a lanthanum nickel anode, an alkaline electrolyte and a cathode such as nickel hydroxide or silver oxide, which battery produced an open circuit voltage of 1.3 volts.

In my battery, a lanthanum nickel anode can be employed in various forms. I prepared initially electrodes of lanthanum nickel by melting lanthanum and nickel together in appropriate proportions resulting in suitable electrodes without further treatment. The electronic conductivity of this compound, lanthanum nickel, equals that of metals thereby eliminating any problem with respect to making suitable contact between a current collector and electrode. Other configurations could be suitable for such an electrode.

A particularly useful construction of such an anode can be a pocket type plate. Such a plate consists of lanthanum nickel granules or particles contained in a pocket made of perforated metal or porous plastic. Such a construction with the desirable elastic properties in the pocket would allow for expansion and contraction of the lanthanum nickel as it absorbs and desorbs hydrogen while simultaneously assuring good physical contact between individual lanthanum nickel particles. This pocket type plate will also prevent loss of material due to fluffing during charge and discharge which has been experienced with a bulk piece of lanthanum nickel as the anode.

Various common commercial cathodes such as nickel hydroxide, silver oxide or manganese dioxide can be employed with the lanthanum nickel anode in an alkaline solution. Various alkaline electrolytes, which are aqueous alkali solutions of any desired concentration, may be used, such as potassium hydroxide or sodium hydroxide. I avoid acid electrolyte solutions since considerable corrosion has been observed employing such acid electrolytes.

I found further that the ampere-hour capacity and hence the energy density of batteries employing my invention including lanthanum nickel as the anode depends upon the capacity of the lanthanum nickel anode to absorb hydrogen. One mol of nickel in lanthanum nickel can absorb up to 6.7 mols of hydrogen. From this data theoretical energy density of my lanthanum nickel-nickel hydroxide battery has been calculated at 100 Wh/lb. I found further that at elevated temperatures less hydrogen can be absorbed at one atmosphere pressure than at room temperature and consequently the ampere-hour capacity of the electrode decreases. In a hermetically sealed battery hydrogen pressure builds up in the battery as the temperature increases.

During charging of the hermetically sealed battery of my present invention, water is discharged on the lanthanum nickel electrode to yield hydroxyl ions and hydrogen is absorbed between electrodes. On discharge of my battery the opposite reaction takes place wherein hydrogen combines with the hydroxyl ions to form water. Examples of batteries made in accordance with my invention are set forth below:

EXAMPLE I

A vented battery was prepared by employing a suitable casing of polypropylene in which was fitted a pair of spaced apart electrodes. The anode was made of lanthanum nickel and had a current collector lead. The anode was prepared by melting together lanthanum and nickel in appropriate proportions of $LaNi_5$. The nickel hydroxide cathode was a conventional commercial cathode which had a current collector lead. 6N potassium hydroxide was employed as the electrolyte which was contained within the battery container and in contact with both of the spaced apart electrodes. The resulting device was a vented battery with a lanthanum nickel anode made in accordance with my invention.

EXAMPLE II

The vented battery of Example I produced an open circuit voltage of 1.3 volts and current densities up to 50 $ma/cm^2$. Further, at 25 $ma/cm^2$ a polarization of approximately 300 mv was observed on charge as well as discharge.

While other modifications of the invention and variations thereof which may be employed within the scope of the invention have not been described, the invention is intended to include such as may be embraced within the following claims:

What I claim as new and desire to secure by Letters Patent of the United States is:

1. A hermetically sealed secondary battery comprising a casing, at least one solid cathode positioned within the casing, at least one hydrogen gas diffusion anode of lanthanum nickel positioned within the casing and spaced from the cathode, and an aqueous alkaline electrolyte in contact with both the cathode and the anode.

2. A hermetically sealed secondary battery as in claim 1, in which the cathode is nickel hydroxide, and the electrolyte is potassium hydroxide.

3. A hermetically sealed secondary battery as in claim 1, in which the lanthanum nickel anode is an alloy plate.

4. A hermetically sealed secondary battery as in claim 1, in which the lanthanum nickel anode consists of a perforated container, and a plurality of lanthanum nickel particles therein.

\* \* \* \* \*